United States Patent [19]
Fujitaki

[11] 4,203,519
[45] May 20, 1980

[54] TAPE CARTRIDGE HOLDER

[75] Inventor: Roy K. Fujitaki, Altadena, Calif.

[73] Assignee: Anthony J. Foto, Pasadena, Calif.

[21] Appl. No.: 933,962

[22] Filed: Aug. 15, 1978

[51] Int. Cl.² .......................................... B65D 85/672
[52] U.S. Cl. ................................................ 206/387
[58] Field of Search ................. 206/387, 561; 312/319

[56] References Cited
U.S. PATENT DOCUMENTS

| | | | |
|---|---|---|---|
| 2,665,808 | 1/1954 | McAlister | 206/561 X |
| 3,385,643 | 5/1968 | Adell | 206/387 X |
| 3,603,478 | 9/1971 | Connan | 206/387 X |
| 3,969,007 | 7/1976 | Lowry | 206/387 X |
| 3,995,737 | 12/1976 | Ackeret | 206/387 |
| 3,995,921 | 12/1976 | Ackeret | 206/387 X |
| 4,022,322 | 5/1977 | Louzil | 206/387 |

FOREIGN PATENT DOCUMENTS 2317184 2/1977 France ..................................... 206/387

*Primary Examiner*—Herbert F. Ross
*Attorney, Agent, or Firm*—Harris, Kern, Wallen & Tinsley

[57] ABSTRACT

A tape cartridge holder comprising a container provided with transverse cartridge compartments respectively having resilient retainers therein along one side of the container and respectively engageable with the edges of cartridges in the compartments. The retainers comprise integral parts of a retainer assembly including a common retainer base from which the retainers project and with which the retainers are integrally formed. The container has a bottom wall provided adjacent one side thereof with a slot within which the retainer base is positioned with the retainers projecting into the compartments along one side of the container. The retainer base in the slot is secured to the container to support the retainers within the compartments.

2 Claims, 5 Drawing Figures

TAPE CARTRIDGE HOLDER

BACKGROUND OF THE INVENTION

The present invention relates in general to a storage device for holding tape cartridges, or the like, when tapes in such cartridges are not being played.

The tape cartridge holder of the invention is particularly useful to store tape cartridges in an automotive vehicle when they are not in use, although the holder of the invention may be employed in any desired location.

The invention contemplates a tape cartridge holder comprising a container provided with transverse compartments respectively receiving tape cartridges therein. The container includes a bottom wall, side walls and end walls, and inwardly-extending partition walls dividing the space between the end walls into the cartridge compartments.

SUMMARY AND OBJECTS OF INVENTION

An important object of the invention is to provide a tape cartridge of the foregoing nature wherein the transverse cartridge compartments respectively have resilient retainers therein along one side of the container and respectively engageable with edges of cartridges in the compartments to releasably retain the cartridges in the compartments.

Another important object is to provide such a tape cartridge holder wherein the retainers comprise integral parts of a retainer assembly having the form of an insert disposed in the container, the retainer assembly including a common retainer base from which the retainers project and with which the retainers are integrally formed.

The invention may be summarized as including, and still another important object is to provide a tape cartridge holder which includes: a container provided with transverse cartridge compartments respectively having resilient retainers therein along one side of the container and respectively engageable with edges of the cartridges in the compartments; the retainers comprising integral parts of a retainer assembly which includes a common retainer base from which the retainers project and with which the retainers are integrally formed; the container having a wall provided adjacent one side thereof with a slot within which the retainer base is positioned with the retainers projecting into the compartments along the aforementioned side of the container; and the retainer base in the slot being secured to the container to support the retainers within the compartments.

Yet another object is to provide a tape cartridge holder wherein the container is a one-piece molded structure formed of a suitable plastic material, and the retainer assembly is also a molded one-piece structure of a suitable plastic material, which may be the same plastic material as the container. The material selected is one which is inherently resilient to a sufficient degree to cause the retainers to hold the cartridges in the compartments.

The foregoing objects, advantages, features and results of the present invention, together with various other objects, advantages, features and results thereof which will be evident to those skilled in the art to which the invention relates in the light of this disclosure, may be attained with the exemplary embodiment of the invention illustrated in the accompanying drawings and described in detail hereinafter.

DESCRIPTION OF EXEMPLARY EMBODIMENT OF INVENTION

Figure 1:
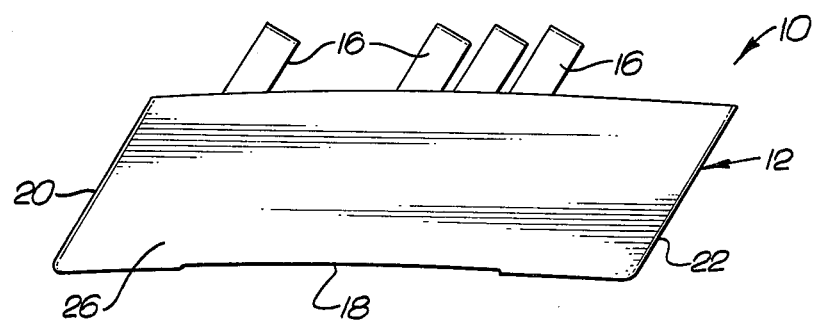
FIG. 1 is a side elevational view of a tape cartridge holder which embodies the invention.
Figure 2:
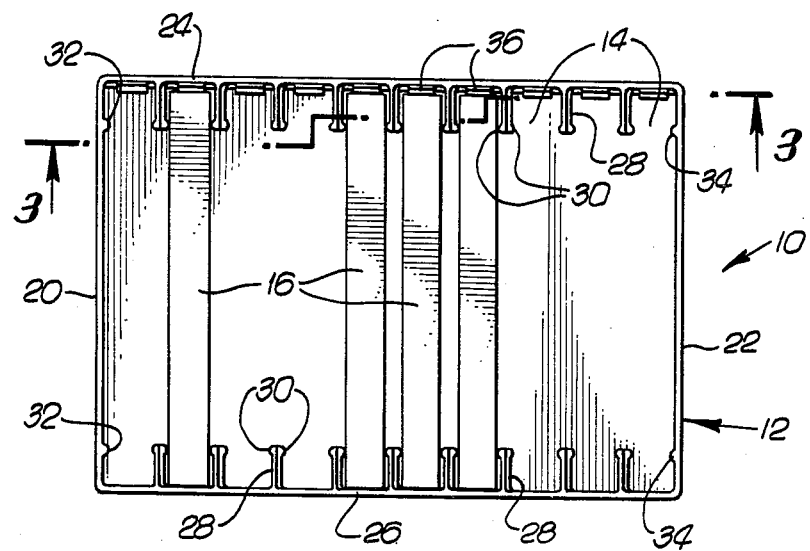
FIG. 2 is a top plan view of the tape cartridge holder.

Referring to the drawings, the tape cartridge holder of the invention is designated generally by the numeral 10 and comprises a container 12 provided with transverse cartridge compartments 14 respectively adapted to receive tape cartridges 16 therein. The container 12 includes a longitudinally arcuate, downwardly concave, bottom wall 18, end walls 20 and 22 and side walls 24 and 26. The cartridge compartments 14 and the end walls 20 and 22 are inclined relative to the bottom wall 18, which may be provided with suitable means, not shown, for mounting the container 12 on a suitable supporting surface.

The cartridge compartments 14 are separated by partition walls or dividers 28 which are parallel to the end walls 20 and 22 and which extend laterally inwardly from the respective side walls 24 and 26. The dividers 28 are provided along their inner edges with beads 30 which are engageable by the tape cartridges 16 to hold them away from the dividers. The end walls 20 and 22 are provided with similar beads 32 and 34 which are engageable by the tape cartridges 16 in the corresponding cartridge compartments 14. As will be apparent, the beads 30, 32 and 34 are all parallel to the inclined cartridge compartments 14 and end walls 20 and 22. These beads permit easy insertion and withdrawal of the tape cartridges 16, which, when inserted into the cartridge compartments 14, project upwardly above the open top of the container 12, as best shown in FIG. 1 of the drawings.

The cartridge compartments 14 respectively have resilient, leaf spring retainers 36 therein along the side wall 24 of the container 12 and respectively engageable with corresponding edges of tape cartridges 16 in such compartments. Engagement of the retainers 36 with the tape cartridges 16 releasably secures the tape cartridges in the corresponding compartments 14.

Figure 5:
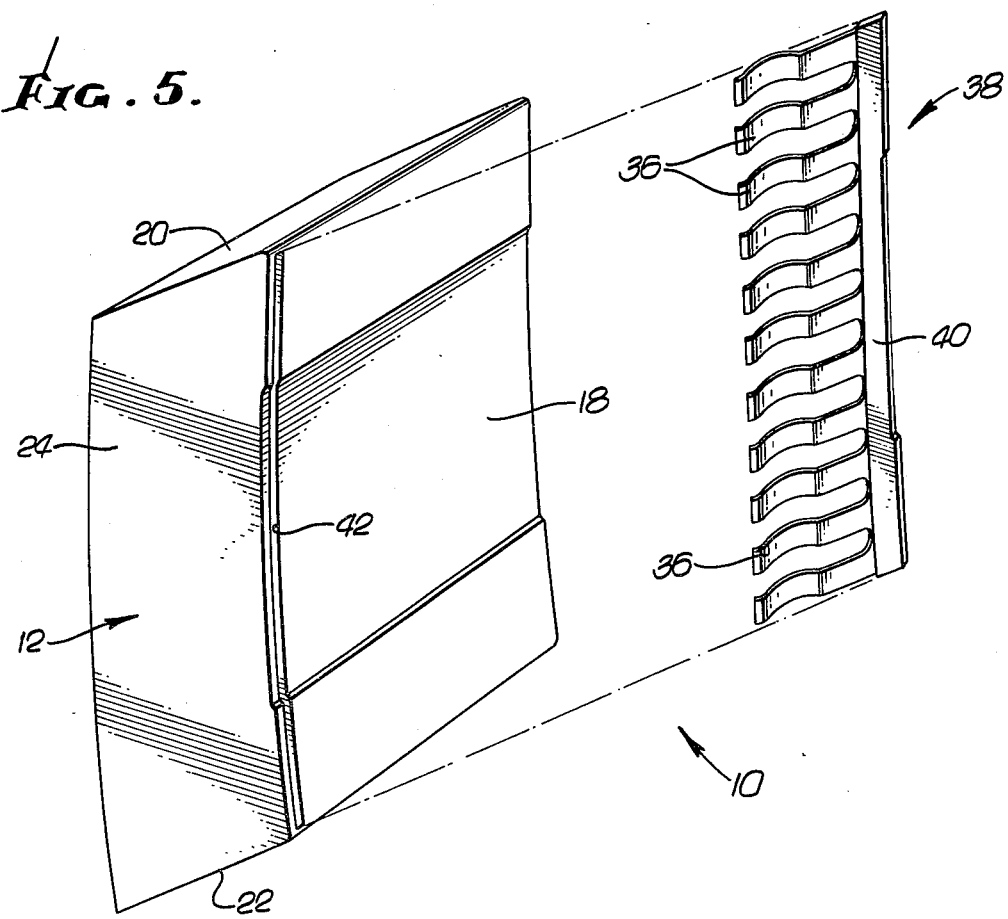
FIG. 5 is an exploded perspective view showing the bottom of a container forming part of the tape cartridge holder and a retainer assembly forming part thereof.

The retainers 36 comprise integral parts of a retainer assembly 38, best shown in FIG. 5, which includes a common retainer base 40 from which the retainers project and with which the retainers are integrally formed. The bottom wall 18 of the container 12 is provided adjacent the side wall 24 thereof with a slot 42 through which the retainers 36 may be inserted into the cartridge compartments 14, and within which the retainer base 40 is positioned with the retainers 36 projecting into the cartridge compartments 14 adjacent the side wall 24 of the container 12. The retainer base 40 is suitably secured to the container 12 to support the retainers 36 in the cartridge compartments 14. For example, the retainer base 40 may be cemented, or otherwise bonded, to the edges of the slot 42 in the bottom container wall 18.

The container 12 is preferably molded in one piece from a suitable plastic, the same being true of the one-piece retainer assembly 38. Preferably, the same plastic is used for both the container 12 and the retainer assembly 38. Examples of suitable plastics are: acrylonitrile butadiene styrene, commonly called ABS; acetal homopolymer, commonly caled delrin; and polymeric amide, commonly called nylon.

Figure 3:
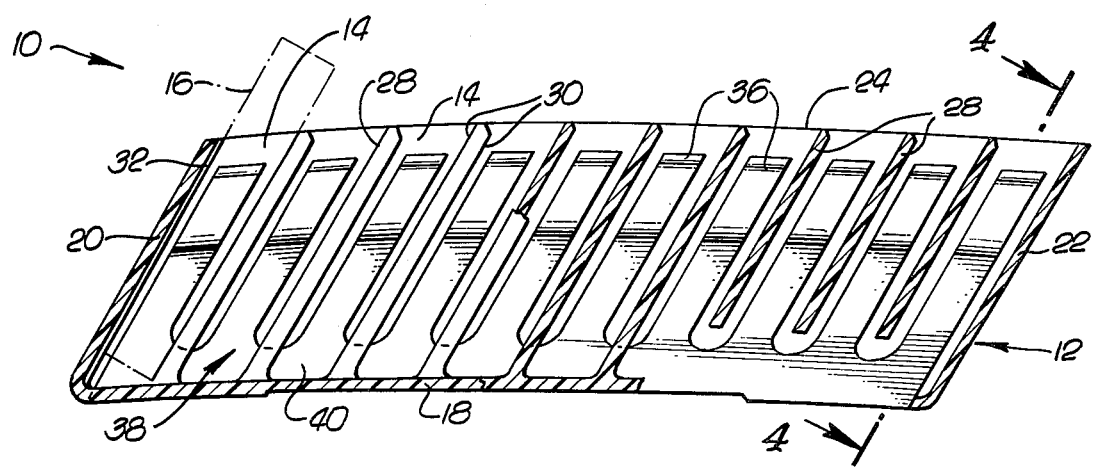
FIG. 3 is an enlarged sectional view taken along the irregular arrowed line 3—3 of FIG. 2.
Figure 4:
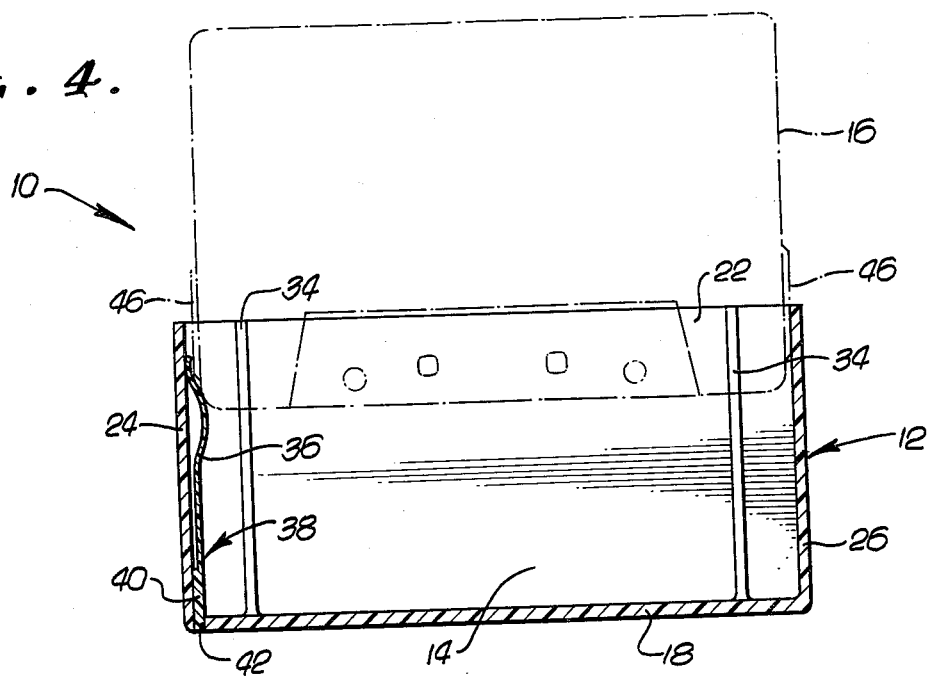
FIG. 4 is a sectional view taken along the arrowed line 4—4 of FIG. 3.

As will be apparent, tape cartridges 16 may be inserted into and removed from the respective cartridge compartments 14 quickly and easily, being positively retained in the cartridge compartments until removal is desired by engagement with the resilient retainers 36. As will be apparent from FIGS. 3 and 5, the resilient retainers 36 have bowed portions which result in positive mechanical engagement with the tape cartridges by riding over projections 46, FIG. 4, on the cartridges to positions above them. This avoids placing continuous stress on the retainers 36, which stress could result in undesirable cold flow.

Although an exemplary embodiment has been disclosed for illustrative purposes, it will be understood that various changes, modifications and substitutions may be incorporated in such embodiment without departing from the invention as hereinafter claimed.

I claim as my invention:

1. In a holder for tape cartridges, or the like, the combination of:
   (a) a container provided with transverse cartridge compartments respectively having resilient retainers therein along one side of said container and respectively engageable with edges of cartridges in said compartments to retain the cartridges therein;
   (b) said retainers comprising integral parts of a retainer assembly which includes a common retainer base from which said retainers project and with which said retainers are integrally formed;
   (c) said container having a wall provided adjacent said one side thereof with a slot within which said retainer base is positioned with said retainers projecting into said compartments along said one side of said container; and
   (d) said retainer base in said slot being fixedly secured to said container to support said retainers within said compartments.

2. A tape cartridge holder, or the like, as defined in claim 1 wherein said wall in which said slot is formed is a bottom wall, said container having end walls extending upwardly from said bottom wall, said end walls and said compartments being inclined relative to said bottom wall.

* * * * *